United States Patent [19]
Liu et al.

[11] 3,786,267
[45] Jan. 15, 1974

[54] METHOD AND APPARATUS

[75] Inventors: Olive Y. Liu, Danbury; John S. Wahl, Ridgefield, both of Conn.

[73] Assignee: Schlumberger Technology Corporation, New York, N.Y.

[22] Filed: Sept. 30, 1971

[21] Appl. No.: 185,426

Related U.S. Application Data

[63] Continuation of Ser. No. 808,923, March 20, 1969, abandoned.

[52] U.S. Cl. ............................................. 250/256
[51] Int. Cl. .............................................. G01t 1/20
[58] Field of Search ...................... 250/83.6 W, 256

[56] References Cited
UNITED STATES PATENTS
2,686,881   8/1954   Herzog et al .............. 250/83.6 W X
3,435,217   3/1969   Givens ...................... 250/83.6 W X Primary Examiner—James W. Lawrence
Assistant Examiner—Davis L. Willis

[57] ABSTRACT

An illustrative embodiment of the invention converts a signal that reflects the natural radioactivity of an earth formation into another signal that is related to the volumetric shale fraction of the formation under observation. Typically, the radiation signal is normalized to a standard formation radioactivity characteristic. The normalized signal then is contrasted with some other physical parameter (e.g., porosity, density) in accordance with the specific mineral composition of the formation in order to produce an output signal that is related to the volumetric shale fraction.

11 Claims, 2 Drawing Figures

METHOD AND APPARATUS

This application is a continuation of U.S. Pat. application Ser. No. 808,923 filed Mar. 20, 1969 and now abandoned.

BACKGROUND OF THE INVENTION

1. Field of the Invention

This invention relates to measuring techniques and, more particularly, to a method and apparatus for measuring the shale concentration of an earth formation in response to the formation's natural radioactivity.

2. Description of the Prior Art

Of the many oil exploration techniques, "logging" boreholes with electrical, sonic and radiation sensitive instruments has been exceptionally successful. The physical characteristics of earth formations traversed by a borehole, observed with the aid of one or more of these logging tools, enables potential oil-bearing zones to be readily identified. Shale deposits, however, when combined with other rock structures often cause these tools to produce responses that are subject to improper interpretation.

For example, shale occasionally is mixed in oil-bearing sand formations. This shale may contain adsorbed water in contrast to the oil that ordinarily lodges in void spaces within the formation materials. Because oil has a high electrical resistance and the entrapped water has a lower resistance, a logging tool that measures formation resistivity may, in shale, indicate a low value characteristic of the water rather than the higher resistivities that suggest oil. If this condition is not recognized, the oil production capabilities of the formation might be overlooked.

Advanced techniques combine the data from several logging tools to provide different or more accurate indications of important formation characteristics. These techniques also are subject to misinterpretation if shale effects are not considered. Typically, some measurement of the volume or volumetric fractions of shale present in the portion of the formation under study are required for analyses of this sort. The need for a technique that provides these quantitative shale measurements, however, has not been satisfied in the prior art.

In contrast to this need, the natural gamma radioactivity of earth formations has been used to provide qualitative shale indications. It has been found, for example, that shale generally exhibits a more intense natural radioactivity than that which characterizes other formation materials. Accordingly, logging tools have been devised for transport through the borehole in order to establish a record of natural gamma radioactivity as a function of borehole depth. These records have been used to determine the interfaces between different formations; to relate formations observed from one borehole with formations in the same field that have been observed from other boreholes; and to provide depth references within the borehole. Some mineral prospecting techniques that rely on natural radioactivity also have been proposed.

None of these foregoing suggestions, however, satisfy the need for reliable shale measurements that can be used either alone or in combination with other logging data as a part of a more detailed evaluation of an earth formation.

SUMMARY

In accordance with the invention, a technique is provided that normalizes, or compares to a standard, the natural gamma radiation signal from a borehole logging tool. This normalized signal is combined with other earth formation-related signals, of which formation porosity and bulk density are typical, to produce an output signal that is related to the formation's shale characteristics.

More specifically, it has been found that the natural gamma radiation intensity, if expressed in terms of the unit mass of the formation and compared to an intensity per unit mass of pure shale is, in general, independent of the formation density. This normalized natural gamma radiation intensity, moreover, reflects the volumetric fraction of the shale under observation as a function only of the formation porosity or density and mineral composition.

Because density, porosity and lithology (or mineral composition) can be accurately determined, for example, through other logging techniques, an examination of drill cutting, or samples taken from the formation (core samples), means are provided to combine these known characteristics with the natural gamma radiation intensity in order to produce an output signal that identifies a specific shale characteristic.

The shale signal may be recorded in visual form as a function of borehole depth. The signal also can be treated in other ways. It can be combined, for instance, with signals from other logging tools to provide further earth formation data, or stored on tape for subsequent manipulation or display.

For a better understanding of the present invention, together with other and further objects thereof, reference is had to the following description taken in connection with the accompanying drawings, the scope of the invention being pointed out in the appended claims.

DESCRIPTION OF THE PREFERRED EMBODIMENTS

Figure 1:
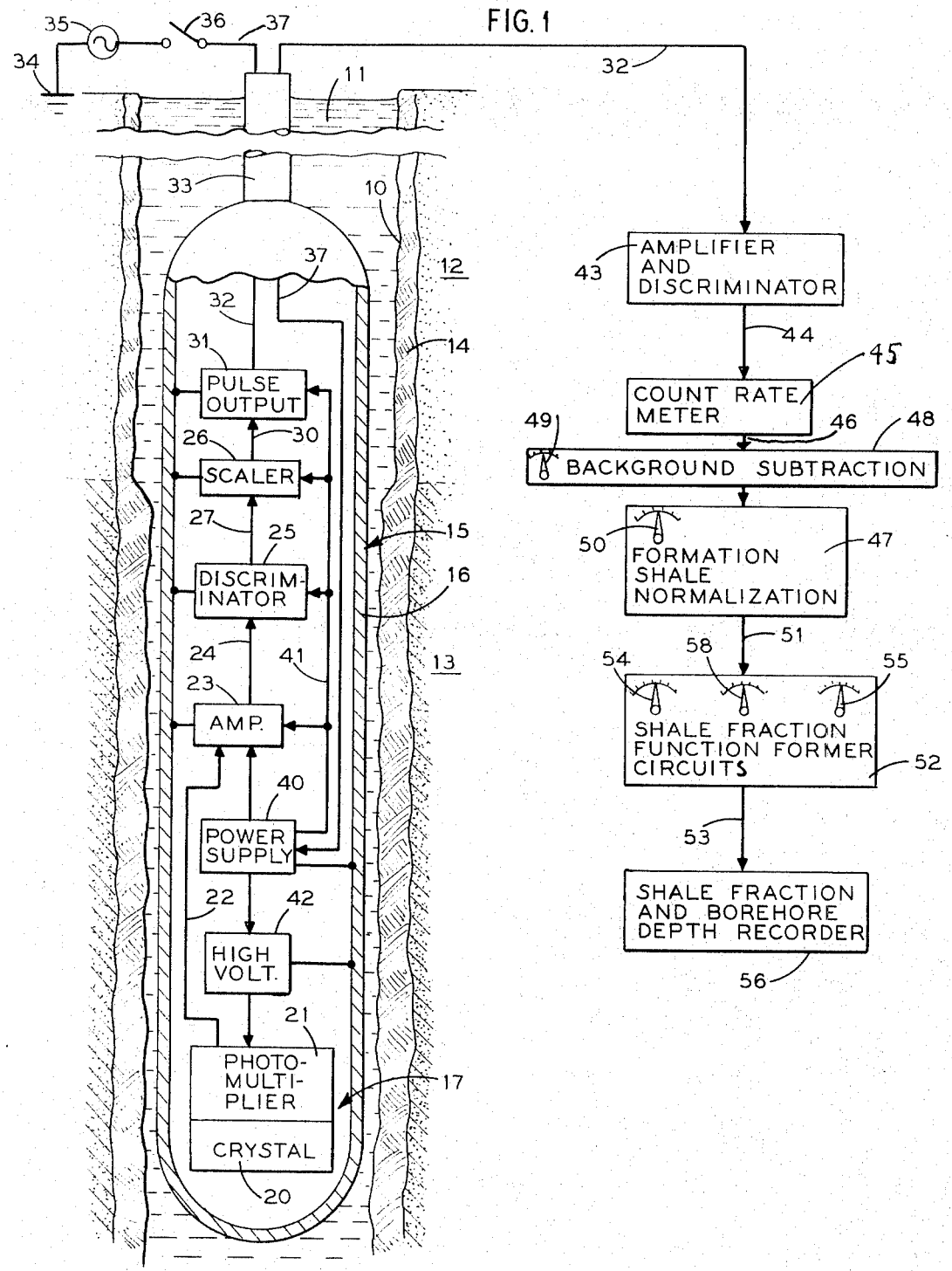
FIG. 1 is a schematic diagram of a logging system exemplifying the principles of the invention.

A typical apparatus for practicing the invention is shown in FIG. 1. As illustrated, a borehole 10 which, for descriptive purposes, is filled with a drilling fluid 11, traverses a "clean" limestone formation 12 that is bedded above a formation 13. The formation 13 comprises, for example, a mixture of shale and limestone. The shale exists as granules interspersed in the limestone ("structural" shale), or as a "dispersed" shale, in which individual grains of limestone are coated with clay or other sedimentary matter.

A mudcake 14 is formed on the borehole walls. The mudcake 14 forms when filtrate from the drilling fluid 11 invades the adjacent formations 12 and 13 and deposits a layer of solid matter. The mudcake frequently varies in thickness in response to the permeability of the adjacent formation and the chemical characteristics of the fluid 11.

A logging tool 15 for measuring the natural radioactivity of the formation traversed by the borehole 10 comprises a fluid and pressure-tight housing 16. Within the housing 16 a scintillation detector 17 responds to the natural gamma radioactivity of the adjacent formation 13. Other radiation detectors, of which ionization chambers and Geiger-Mueller detectors are typical, also may be used in the logging tool 17. Gamma radiation emitted from the formation 13 is registered in a scintillation crystal 20 through the generation of a brief internal flash of light in response to each detected radiation.

Each of these individual light pulses cause a few electrons to be emitted from a photosensitive surface (not shown) in a photomultiplier tube 21 that is optically coupled to the crystal 20. These electrons are accelerated through the tube by means of an electrically charged dynode structure (also not shown) to generate an amplified charge pulse in a photomultiplier output conductor 22. The amplified charge pulse in the conductor 22 is connected to an amplifier 23 for further downhole processing.

To eliminate spurious signals caused, for example, by "dark current" within the photomultiplier tube 21, the amplified scintillation detector signals are sent through a conductor 24 to a pulse height discriminator circuit 25. The circuit 25 rejects all signals from the amplifier 23 below an arbitrarily selected amplitude in order to eliminate most of the "noise" and pass the bona fide radiation signals on for further processing.

To process these signals for transmission to the earth's surface, a scaler circuit 26 coupled to the discriminator circuit 25 through a conductor 27 applies one signal pulse to an output conductor 30 in response to each predetermined number of input signals in the conductor 27. Thus, for example, if the scaler 26 is set to reduce the signal by a factor of two, one output signal is applied to the conductor 30 in response to every two input signals coupled to the scaler input conductor 27.

The scaled pulses in the conductor 30 are prepared in a pulse output circuit 31 for transmission through a conductor 32 in an armored cable 33 for transmission to the earth's surface. The cable 33, wound on a winch (not shown) at the earth's surface also enables the logging tool 15 to be lowered in and withdrawn from the borehole 10.

Power for the downhole circuits is completed through a path that includes ground 34 on the earth's surface, alternating current generator 35, enabled switch 36 and a conductor 37 in the armored cable 33.

Downhole, the alternating current power in the conductor 37 is coupled to power supply 40. The power supply 40 converts the applied current into a direct current for energizing the amplifier 23, the discriminator 25, the scaler 26 and the pulse output circuit 31 through a conductor 41. The power supply also energizes a high voltage circuit 42 in order to establish the direct current potential needed for the photomultiplier tube 21.

On the earth's surface the scaled natural gamma ray signal in the conductor 32 preferably is received continuously as the logging tool 15 is drawn upwardly through the borehole 10. This signal is coupled to an amplifier and discrimination circuit 43 that prepares the signals from the logging tool 15 for further processing and eliminates noise induced in the conductor 32 during transmission through the armored cable 33. These pulses are applied through a conductor 44 to a count rate meter 45 that converts the individually received scaled pulses into an output signal in a conductor 46 that corresponds to the natural gamma radioactivity registered downhole at the scintillation detector 17 as a function of time.

Because there always is some "background" radioactivity in all earth formations, even those that are entirely shale-free, some allowance ought to be made for this phenomenon in the count rate signal. Accordingly, a background subtraction circuit 48 is coupled to the count rate meter conductor 46. A dial 49 enables the radiation background registered in the detector 17 during passage through the shale-free formation 12 to be applied to the subtraction circuit 48 in order to effect the desired compensation.

The observed background is not entirely due to the natural radioactivity of the formation 12, but depends to a certain extent on electrical noise and the like that characterizes the detection system. The background setting for the dial 49 can be applied through automatic control. The specific value of the setting, moreover, can be established not only through observation in the borehole 10, but also as a result of field experience.

In accordance with one aspect of the invention, it has been found that the natural gamma radioactivity of an earth formation, when normalized or contrasted to a standard natural gamma radiation count rate observed in pure shale varies in intensity only as a function of changes in the formation's volumetric shale fraction, a mass characteristic of the formation (e.g., porosity or density) and lithology. It has been found, moreover, that the relation existing between these formation characteristics is not one of direct proportionality but is nonlinear in nature. Accordingly, the background compensated natural radioactivity signal in the output from the circuit 48 is "normalized" in a circuit 47.

Preferably, the shale normalization circuit 47 continuously divides the pure shale signal set through a dial 50 into the signal from the background circuit 48. Typically, a count rate representative of a pure shale formation can be determined through logging in a formation known to be of that sort, or from field experience. A normalized output signal in a conductor 51 corresponds to the shale concentration, C (FIG. 2), in which an electrical signal that corresponds to the numerical value one is indicative of pure shale, and a value zero signifies a shale-free formation.

Other normalization techniques also can be used. Multiplying, for example, the natural gamma radiation signal with the formation bulk density also provides a satisfactory input.

In accordance with another aspect of the invention, shale fraction function former circuits 52 convert the normalized signal in the conductor 51 into an output signal in a conductor 53 that is functionally related, for instance, to the fraction of each unit volume of the formation 13 that is composed of shale. As described subsequently in more complete detail, the individual function former circuit that corresponds to the dominant chemical or mineral composition of the formation 13 is manually selected through manipulation of a dial 54 associated with the circuits 52. The porosity of the formation also is applied to the specific circuit (not shown) among the shale circuits 52 through operation of a porosity dial 55.

The dial 55 illustratively may control a voltage that is applied to an input terminal on the selected one of the circuits 52. The selected circuit may comprise, for example, an operational amplifier with a feedback network (not shown). The other terminal of the amplifier may be coupled to the normalized and background-corrected signal in the conductor 51. The output of this circuit, when applied to the conductor 53 corresponds to the shale fraction of the formation 13.

The shale fraction signal in the conductor 53 is connected to a recorder 56 that registers the shale fraction signal as a continuous function of borehole depth. The recorder 56 can produce, for example, a trace on a log or a signal that is impressed on computer tape for subsequent display or processing in accordance with logging specific needs.

Figure 2:
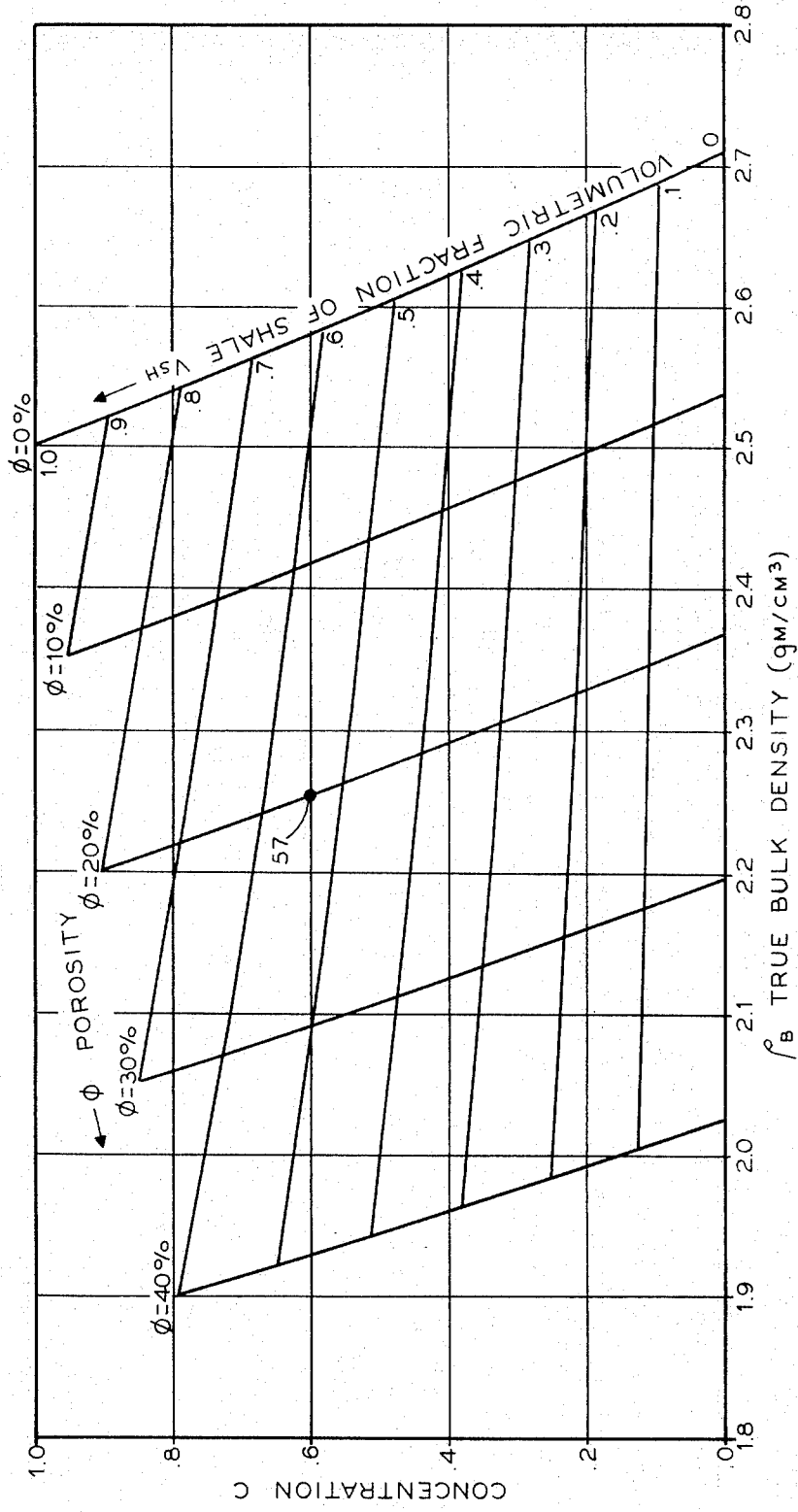
FIG. 2 is a graph showing a typical response for one of the circuits shown in FIG. 1.

An illustrative shale fraction function former circuit response for a shaly limestone is shown in FIG. 2. Thus, the porosity $\phi$ of the formation 13, which preferably has been determined through other logging techniques, is applied to the dial 55. The voltage corresponding to the correct porosity identifies a point within the area defined by the graph that determines the volumetric fraction of shale. The specific function former circuit that produces the response shown in FIG. 2 previously was selected through manipulation of the switch 54 to the limestone detent (not shown).

Because the shale concentration C is directly proportional to the normalized natural gamma radiation signal in the conductor 51, the combination of the porosity $\phi$ and the normalized shale signal C identifies a point in the area defined by the curve in FIG. 2.

By way of example, with a normalized concentration signal in the conductor 51 that corresponds to 0.6 and a potential that is related to a formation porosity of 20 percent, a point 57 is identified on the graph in FIG. 2. This point corresponds to a shale fraction of approximately .54. The output signal in the conductor 53 (FIG. 1) is appropriately calibrated to reflect this result.

Thus, there is provided in accordance with the invention a technique that preferably generates a continuous shale fraction signal in terms of borehole depth.

Alternatively, formation bulk density ($\rho_B$) can be employed as an entry argument to solve the shale fraction problem. Accordingly, a formation true bulk density of about 2.25 grams per cubic centimeter, when combined with the aforementioned 0.6 concentration signal also identifies the point 57 that characterizes a shale fraction of about 0.54. To implement structurally this feature of the invention, a dial 58 is provided on the shale fraction function former circuits 52. The dial 58 is calibrated in terms of formation true bulk density and, when manipulated to the exclusion of the porosity dial 55, applies a potential to the selected function former circuit that corresponds to the observed true density.

Although analog circuits have been disclosed in connection with the embodiments hereinbefore described, the principles of the invention can be applied to other techniques, of which digital computation is typical. Appropriate ground connections of course should be made for the apparatus shown herein. The invention, moreover, need not be limited to natural gamma radiation analysis, but also can be used in connection with other radiations, as for example, beta emission.

Other parameters that are quantitatively related to the shale structure of the earth formation also can be substituted or used in addition to the shale fraction signal described herein. Automatic porosity and lithology selection also can be substituted for the described manual technique. For instance, in response to successive rounds of analyses, several lithologies and porosities can be automatically substituted in the circuits 47 and 52 until a satisfactory agreement between the various logging tool measurements is achieved.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. Apparatus for measuring the shale fraction of an earth formation traversed by a borehole comprising, a tool for transport through the borehole that generates signals in response to the natural gamma radioactivity of the earth formation, circuit means for amplifying said signal and discriminating against spurious portions thereof, normalization circuit means for dividing said natural radioactivity signal with a signal that corresponds to a pure shale formation to produce a normalized signal, shale fraction circuit means responsive to said normalized signal to generate an output signal that corresponds to the shale fraction, means for selecting said shale fraction circuit response in accordance with a mass characteristic and the mineral composition of the earth formation, and recorder means for registering said shale fraction signal in terms of the borehole depth.

2. Apparatus according to claim 1 wherein said characteristic comprises a signal that corresponds to the earth formation bulk density.

3. Apparatus according to claim 1 wherein said mass characteristic comprises a signal that corresponds to the earth formation porosity.

4. Apparatus according to claim 1 further comprising background compensation circuit means for adjusting said amplified and discriminated signal in accordance with the natural radioactivity of a shale-free portion of the earth formation.

5. A computer for generating a signal that corresponds to the shale fraction of an earth formation traversed by a borehole comprising, means for generating a signal that corresponds to the natural readioactivity of the earth formation, normalization circuit means for dividing or multiplying said natural radioactivity signal with a signal that corresponds to a pure shale formation to produce a normalized signal, shale fraction circuit means responsive to said normalized signal to produce an output signal that corresponds to the shale fraction, means for selecting said shale fraction circuit response in accordance with the earth formation lithology, and means for coupling a signal that corresponds to a mass characteristic of the earth formation to said shale fraction circuit means.

6. A method of processing well logging data, comprising:
   a. producing signals representative of the natural radioactivity of a formation at selected depth levels over a section of a bore hole;
   b. producing at least one signal representative of the bulk density of the formation over said bore hole section; and
   c. combining representations of said at least one bulk density signal with representations of said natural radioactivity signals to produce output representations of natural radioactivity compensated for formation bulk density.

7. The method of claim 6 and further including the steps of producing at least one signal representative of the porosity of the formation over said bore hole section, and combining said output representations of natural radioactivity compensated for formation bulk density with representations of said at least one signal representative of porosity to produce output data related to the formation shale content over said bore hole section.

8. A method of processing well logging data, comprising:
 a. producing signals representative of the natural radioactivity of a formation at selected depth levels over a section of a bore hole;
 b. producing at least one signal representative of the porosity of the formation over said bore hole section; and
 c. combining, for each selected depth level, representations of said at least one porosity signal with representations of said natural radioactivity signals to produce output data functionally related to the formation shale content at each selected depth level.

9. A method of processing well logging data, comprising:
 a. producing signals representative of the natural radioactivity of a formation at selected depth levels over a section of a bore hole;
 b. producing at least one signal representative of the bulk density of the formation over said bore hole section; and
 c. combining, for each selected depth level, representations of said at least one bulk density signal with representations of said natural radioactivity signals to produce output data functionally related to formation shale content at each selected depth level over said bore hole section.

10. The method of claim 6 wherein the step of combining includes the steps of multiplying a function of the natural radioactivity signals with a function of said at least one bulk density signal to produce said output representations.

11. The method of claim 10 and further including the step of deriving from said output representations at least one representation of the formation shale content over said bore hole section.

* * * * *